United States Patent
Bjertrup Nielsen

(10) Patent No.: US 11,225,948 B2
(45) Date of Patent: Jan. 18, 2022

(54) WIND ENERGY FARM WITH CABLE STAYED WIND TURBINES

(71) Applicant: Vestas Wind Systems A/S, Aarhus N. (DK)

(72) Inventor: Thomas S. Bjertrup Nielsen, Randers Sv (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/772,209

(22) PCT Filed: Dec. 12, 2018

(86) PCT No.: PCT/DK2018/050348
§ 371 (c)(1),
(2) Date: Jun. 12, 2020

(87) PCT Pub. No.: WO2019/114900
PCT Pub. Date: Jun. 20, 2019

(65) Prior Publication Data
US 2021/0071641 A1  Mar. 11, 2021

(30) Foreign Application Priority Data
Dec. 14, 2017  (DK) .................................. 2017 70942

(51) Int. Cl.
*F03D 13/20* (2016.01)
*F03D 1/06* (2006.01)

(52) U.S. Cl.
CPC ........... *F03D 13/20* (2016.05); *F03D 1/0675* (2013.01); *F05B 2240/912* (2013.01);
(Continued)

(58) Field of Classification Search
CPC .. F03D 13/20; F03D 1/0675; F05B 2240/912; F05B 2240/917; F05B 2240/20; F05B 2270/321
See application file for complete search history.

(56) References Cited

U.S. PATENT DOCUMENTS

| 2002/0105190 A1* | 8/2002 | Thomas ............... F03D 3/02 290/55 |
| 2012/0139253 A1* | 6/2012 | Lambert ............ F03D 13/20 290/55 |

(Continued)

FOREIGN PATENT DOCUMENTS

| AT | 517671 A2 | 3/2017 |
| DE | 19615795 A1 | 10/1997 |
| DE | 102006043470 B3 | 1/2008 |

OTHER PUBLICATIONS

European Patent Office, International Search Report and Written Opinion in PCT Application No. PCT/DK2018/050348, dated Mar. 13, 2019.

(Continued)

*Primary Examiner* — Sean Gugger
(74) *Attorney, Agent, or Firm* — Wood Herron & Evans LLP

(57) ABSTRACT

A wind energy farm (1) comprising at least one first wind turbine (2) and at least one second wind turbine (3) is disclosed. Each wind turbine (2, 3) comprises a tower (7) mounted on a foundation, and at least one rotor (9) with a hub carrying a set of wind turbine blades (10). The at least one first wind turbine (2) is provided with at least three stay cables (4), each stay cable (4) being connected at one end to the tower (7) of said at least one first wind turbine (2) and at the other end to a stay cable foundation. At least one of the stay cable foundations and the foundation of one of said (Continued)

at least one second wind turbines (3) of the wind energy farm (1) are combined into a single combination foundation.

14 Claims, 5 Drawing Sheets

(52) U.S. Cl.
CPC ..... *F05B 2240/917* (2013.01); *F05B 2240/96* (2013.01); *F05B 2270/321* (2013.01)

(56) References Cited

U.S. PATENT DOCUMENTS

| | | | | |
|---|---|---|---|---|
| 2014/0039843 A1* | 2/2014 | Hazra | ..................... | G06F 30/20 |
| | | | | 703/1 |
| 2015/0308139 A1* | 10/2015 | Wagner | ..................... | E04C 5/08 |
| | | | | 52/1 |

OTHER PUBLICATIONS

Danish Patent and Trademark Office, Search and Examination Report in PA 2017 70942, May 29, 2018.

* cited by examiner

WIND ENERGY FARM WITH CABLE STAYED WIND TURBINES

FIELD OF THE INVENTION

The present invention relates to a wind energy farm comprising at least two kinds of wind turbines, where at least some of the wind turbines of the wind energy farm are provided with stay cables. The wind turbines are of the horizontal axis type (HAWT).

BACKGROUND OF THE INVENTION

Wind turbines normally comprise a tower mounted on a foundation and one or more rotors mounted on the tower. Each rotor comprises a hub carrying a set of wind turbine blades arranged to be directed towards the incoming wind. When the incoming wind acts on the wind turbine blades, the wind turbine blades cause the hub to rotate, thereby extracting energy from the wind. This rotational movement is transferred to a generator, either directly or via a gear system, and the generator transforms the rotational movement into electrical energy, which is subsequently supplied to a power grid.

It is sometimes desirable to provide wind turbines with a high hub height, i.e. with the hub arranged at a large distance from the ground. There are several reasons for this. A large rotor diameter, i.e. a large area being swept by the wind turbine blades, provides a high power production. Large rotor diameters require a high hub height in order to ensure a sufficient distance between the tips of the wind turbine blades and the ground. Furthermore, the available energy in the wind normally increases with the distance to the ground, and a high hub height will therefore allow the rotor to extract more energy from the wind.

High hub heights require high towers, and special measures need to be taken in order to ensure the stability of high towers. One way of ensuring the stability of a high tower is to increase the thickness of the tower walls. This increases the amount of material used for the tower, thereby increasing the weight as well as the manufacturing costs of the tower. Another way is to provide the tower with stay cables being connected to the tower at one end and to a stay cable foundation at the other end. This requires separate stay cable foundations to be established, thereby increasing the costs involved with installing the wind turbine.

Wind turbines may be positioned in wind energy farms, i.e. geographical sites accommodating a plurality of wind turbines, which may also share infrastructure, such as grid connections, access roads, supply lines, communication lines, etc.

DESCRIPTION OF THE INVENTION

It is an object of embodiments of the invention to provide a wind energy farm where the costs relating to installation of the wind energy farm are reduced as compared to prior art wind energy farms.

According to a first aspect the invention provides a wind energy farm comprising at least one first wind turbine and at least one second wind turbine, each wind turbine comprising a tower mounted on a foundation, and at least one rotor with a hub carrying a set of wind turbine blades, wherein said at least one first wind turbine is provided with at least three stay cables, each stay cable being connected at one end to the tower of said at least one first wind turbine and at the other end to a stay cable foundation, wherein at least one of the stay cable foundations and the foundation of one of said at least one second wind turbines of the wind energy farm are combined into a single combination foundation. The at least one first wind turbine has a higher hub height than the at least one second wind turbine. Hub heights of the wind turbines of the first kind, i.e. the wind turbines which are provided with stay cables, are higher than the hub heights of the wind turbines of the second kind.

In the present context the term 'wind energy farm' should be interpreted to mean a group of wind turbines arranged at a limited geographical site, and which may share various kinds of infrastructure, such as grid connections, access roads, supply lines, communication lines, etc.

The wind energy farm according to the first aspect of the invention comprises at least one first wind turbine and at least one second wind turbine. Accordingly, at least two kinds of wind turbines are accommodated in the wind energy farm. Each of the wind turbines of the wind energy farm comprises a tower mounted on a foundation and at least one rotor with a hub carrying a set of wind turbine blades. Thus, each of the wind turbines of the wind energy farm is capable of producing electrical energy in the manner described above.

The at least one first wind turbine is provided with at least three stay cables. Accordingly, the first wind turbines are of a kind being provided with towers which are stabilized by means of stay cables. Each stay cable is connected at one end to the tower of the relevant wind turbine and at the other end to a stay cable foundation. The at least three stay cables of a given wind turbine may advantageously be arranged substantially equidistantly along a circumference of the tower. For instance, if the wind turbine comprises three stay cables, the stay cables may be arranged with an angular distance of approximately 120°. Thereby the tower is supported in a substantially uniform manner in all directions.

The stay cable foundations may, e.g., be in the form of earth anchors, gravity foundations, or any other suitable kind of foundations.

At least one of the stay cable foundations and the foundation of one of the at least one second wind turbines of the wind energy farm are combined into a single combination foundation. Accordingly, the foundation of at least one of the wind turbines of the second kind is further used as a stay cable foundation for at least one of the wind turbines of the first kind. Thereby it is not necessary to provide a separate stay cable foundation, and therefore the costs involved with installing the wind energy farm can be reduced. Simultaneously, the first wind turbines of the wind energy farm can be provided with towers having a small wall thickness, because the towers are stabilized by means of stay cables. This also reduces the total costs involved with installing the wind energy farm.

As mentioned above, the higher the hub height, and thereby the higher the height of the tower, the more relevant it will be to provide the tower with stay cables. It is therefore an advantage to provide the wind turbines with the highest hub height with stay cables, but not necessarily provide the wind turbines with a lower hub height with stay cables.

According to this embodiment, the wind turbines of the first kind and the wind turbines of the second kind may be arranged in the wind energy farm in such a manner that wind turbines of the first kind are arranged next to wind turbines of the second kind and vice versa. The different hub heights will ensure that wake effects from one wind turbine to the wind turbines arranged immediately adjacent thereto are minimised, and this allows the wind turbines to be arranged with a small distance there between. Thereby the available space at the site of the wind energy farm can be well utilised, and the total power production per unit area can be maximised. Furthermore, the small distance between the wind turbines makes it very suitable to use the foundations of neighbouring wind turbines as stay cable foundations, because this will not require excessively long stay cables or undesirable angles between the stay cable and the ground level.

All of the first wind turbines of the wind energy farm may have substantially identical hub heights and/or all of the second wind turbines of the wind energy farm may have substantially identical hub heights. As an alternative, the hub heights may vary among the first wind turbines and/or among the second wind turbines, while the hub heights of all of the first wind turbines is still higher than the hub heights of all of the second wind turbines.

As an alternative, the hub heights of the first wind turbines may be lower than the hub heights of the second wind turbines. In this case the wind turbines having the lower hub height are the ones being provided with stay cables. This could, e.g., be relevant in the case that additional wind turbines are erected in an already existing wind energy farm. The wind turbines which are already present in the wind energy farm may be dimensioned in such a manner that stay cables are not required, whereas the new wind turbines may be dimensioned in such a manner that stay cables are required, even though the hub height of the new wind turbines is lower than the hub height of the existing wind turbines, e.g. in order to allow the new wind turbines to be arranged between the existing wind turbines without introducing undesirable wake effects. The foundations of the existing wind turbines may then be used as stay cable foundations for the stay cables of the new wind turbines.

Thus, the at least one first wind turbine may have a hub height which differs from the hub height of the at least one second wind turbine.

The at least one first wind turbine may have a rotor diameter which differs from a rotor diameter of the at least one second wind turbine. In the case that the hub height of the at least one first wind turbine is higher than the hub height of the at least one second wind turbine, the rotor diameter of the at least one first wind turbine may advantageously be larger than the rotor diameter of the at least one second wind turbine. This allows the wind turbines of the wind energy farm to be arranged with optimized use of the available wind by minimizing the occurrence of rotors of upstream wind turbines overlapping rotors of wind turbines arranged immediately downstream to them.

The wind energy farm may comprise at least one wind turbine cluster, each wind turbine cluster comprising one first wind turbine and at least one second wind turbine.

According to this embodiment, the wind turbines of the wind energy farm are grouped into wind turbine clusters, each being defined by a first wind turbine and including one or more of its neighbouring wind turbines of the second kind. A given wind turbine cluster may advantageously comprise one first wind turbine and all of the second wind turbines having combination foundations which the stay cables of the first wind turbine are connected to. It is not ruled out that one or more of the second wind turbines of the wind energy farm may form part of more than one wind turbine cluster. This could, e.g., be the case if stay cables of more than one first wind turbine are connected to the foundation of the same second wind turbine.

Thus, the wind energy farm may comprise at least two wind turbine clusters and at least one of the stay cables of at least two neighbouring wind turbine clusters may share a combination foundation. This even further reduces the need for providing separate stay cable foundations.

The wind energy farm may comprise at least two wind turbine clusters, and a first wind turbine of one wind turbine cluster and a first wind turbine of a neighbouring wind turbine cluster may be arranged with a distance, A, between them. Since each wind turbine cluster comprises only one first wind turbine, the distance between first wind turbines of two neighbouring wind turbine clusters may be regarded as defining a distance between the neighbouring wind turbine clusters.

The distance, A, between first wind turbines of neighbouring wind turbine clusters may be at least 3 times a rotor diameter of the wind turbines. Thereby it is ensured that the first wind turbines of the wind energy farm are arranged with a mutual distance which is sufficient to substantially avoid wake effects between the first wind turbines. The wake effect occurs when the rotor of an upstream wind turbine at least partly overlaps with the rotor of a downstream wind turbine.

The first wind turbine and each of the at least one second wind turbines of a wind turbine cluster may be arranged with a distance, d, between them. The distance, d, between the first wind turbine and each of the at least one second wind turbines of a wind turbine cluster may be between 1.1 and 3.0 times a rotor diameter of the wind turbines, such as between 1.2 and 2.5 times the rotor diameter, such as between 1.5 and 2.0 times the rotor diameter, such as approximately 1.5 times the rotor diameter or approximately 1.7 times the rotor diameter. In the case that the rotor diameter of the at least one first wind turbine differs from the rotor diameter of the at least one second wind turbine, the distance, d, may be defined by means of the larger of the rotor diameters, or, if there is a predominant wind direction for the site of the wind energy farm, by means of the rotor diameter of the upstream wind turbine.

According to on embodiment of the invention, the distance between an upstream first wind turbine or second wind turbine and a downstream second wind turbine or first wind turbine, respectively, with overlapping rotors, may be at least 3 times the rotor diameter of the upstream wind turbine.

In standard prior art wind energy farms the wind turbines are normally arranged with a mutual distance of at least 3 times the rotor diameter in order to avoid undesirable wake effects, resulting in reduced power production of the wind turbines arranged downwind as well as high loads on the wind turbines. According to this embodiment of the invention, the wind turbines within a wind turbine cluster of the wind energy farm can be positioned closer to each other because the wind turbines of the wind energy farm are of two different kinds. This is in particular relevant when the hub height of the first wind turbines differs from the hub height of the second wind turbines. Thus, the distance between individual wind turbines of the wind energy farm may be less than 3 times the rotor diameter, while still maintaining a distance between the rotors of an overlapping downstream wind turbine and an upstream wind turbine of at least 3 times the rotor diameter.

At least one of the second wind turbines may be provided with at least three stay cables. According to this embodiment one or more of the second wind turbines may also be provided with stay cables.

At least one of the stay cables of the at least one second wind turbine may be connected to a combination foundation formed at the foundation of a first wind turbine. According to this embodiment, the foundations of the second wind turbines serve as stay cable foundations for the stay cables of the first wind turbines and the foundations of the first wind turbines serve as stay cable foundations for the stay cables of the second wind turbines.

All of the second wind turbines may be provided with stay cables. Alternatively, some of the second wind turbines may be provided with stay cables and some of the second wind turbines may not be provided with stay cables.

At least one stay cable of at least one first wind turbine may be connected to a stay cable foundation to which a stay cable of another first wind turbine is also connected. The stay cable foundation may be a separate stay cable foundation or it may be in the form of a combination foundation. Alternatively or additionally, in the case that at least one second wind turbine is provided with stay cables, stay cables from at least one first wind turbine and from at least one second wind turbine may be connected to a common stay cable foundation. This also reduces the need for separate stay cable foundations for each stay cable, thereby reducing the costs involved with installing the wind energy farm.

At least one stay cable of at least one of the first wind turbines defines an angle with respect to horizontal which is between 35° and 50°, such as between 40° and 48°, such as approximately 45°. According to this embodiment, the stay cables are connected to the tower in such a manner that the pull on the tower provided by a given stay cable comprises a significant horizontal component as well as a significant vertical component. This results in a good support for the tower and significantly reduces bending moments.

At least one of the wind turbines may be a multirotor wind turbine. In the present context the term 'multirotor wind turbine' should be interpreted to mean a turbine comprising two or more rotors mounted on a common tower structure. The rotors could, e.g., be mounted on one or more arms extending from a substantially vertical main tower part, in which case the one or more arms may be arranged to perform yawing movements relative to the main tower part.

As an alternative, all of the wind turbines of the wind energy farm may be single rotor wind turbines, i.e. wind turbines comprising only a single rotor.

According to a second aspect the invention provides a wind turbine for use in a wind energy farm according to the first aspect of the invention, the wind turbine comprising a tower mounted on a foundation, at least one rotor with a hub carrying a set of wind turbine blades, and at least three stay cables connected at one end to the tower of the wind turbine and at the other end to a stay cable foundation, wherein at least one of the stay cable foundations and the foundation of another wind turbine arranged in the wind energy farm are combined into a single combination foundation.

It should be noted that a person skilled in the art would readily recognise that any feature described in combination with the first aspect of the invention could also be combined with the second aspect of the invention, and vice versa.

The wind turbine of the second aspect of the invention may advantageously be a wind turbine of the first kind in a wind energy farm according to the first aspect of the invention, as described above.

BRIEF DESCRIPTION OF THE DRAWINGS

The invention will now be described in further detail with reference to the accompanying drawings in which.

DETAILED DESCRIPTION OF THE DRAWINGS

Figure 1:
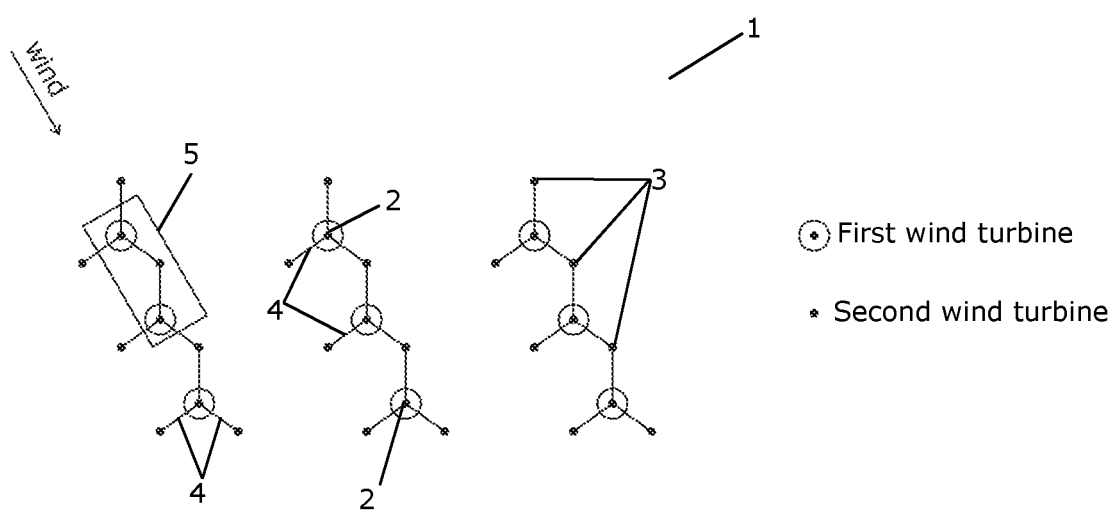
FIG. 1 illustrates a layout of a wind energy farm according to a first embodiment of the invention.

FIG. 1 illustrates a layout of a wind energy farm 1 according to a first embodiment of the invention. FIG. 1 shows nine first wind turbines 2 and twenty-one second wind turbines 3. It is not ruled out that the wind energy farm 1 may comprise further wind turbines.

Each of the first wind turbines 2 is provided with three stay cables 4, and each stay cable 4 is connected at one end to a tower of the first wind turbine 2, and at the other end to the foundation of one of the second wind turbines 3. Accordingly, the foundations of the second wind turbines 3 are in the form of combination foundations serving as foundations for the second wind turbines 3 as well as serving as stay cable foundations for the stay cables 4. Thereby separate stay cable foundations for the stay cables are not required, and this reduces the costs involved with installing the wind energy farm 1.

The wind turbines 2, 3 of the wind energy farm 1 are grouped into wind turbine clusters, in the embodiment of FIG. 1, each wind turbine cluster comprising one first wind turbine 2 and the three second wind turbines 3 having foundations to which the stay cables 4 of the first wind turbine 2 are connected. Some of the second wind turbines 3 have stay cables 4 of two of the first wind turbines 2 connected to their foundation. These second wind turbines 3 form part of the wind turbine clusters defined by both of these first wind turbines 2.

Figure 3:
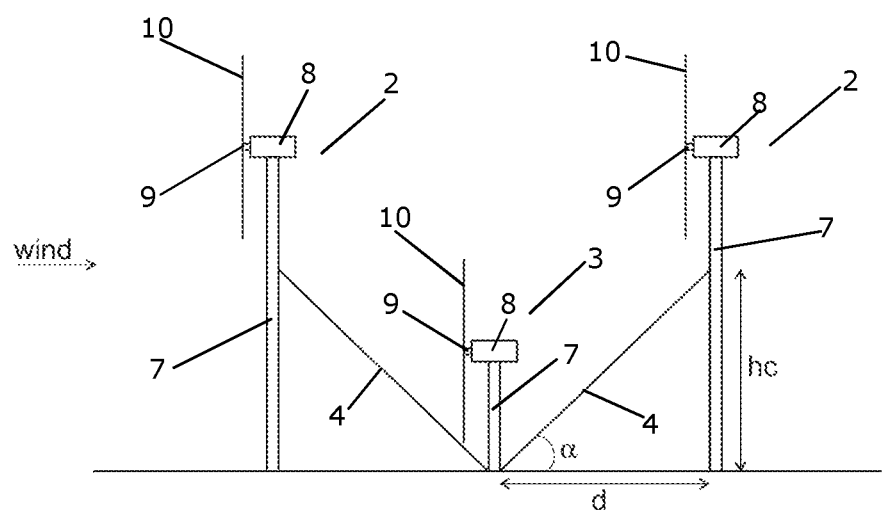
FIG. 3 is a side view of three wind turbines of the wind energy farm of FIG. 1.
Figure 4:
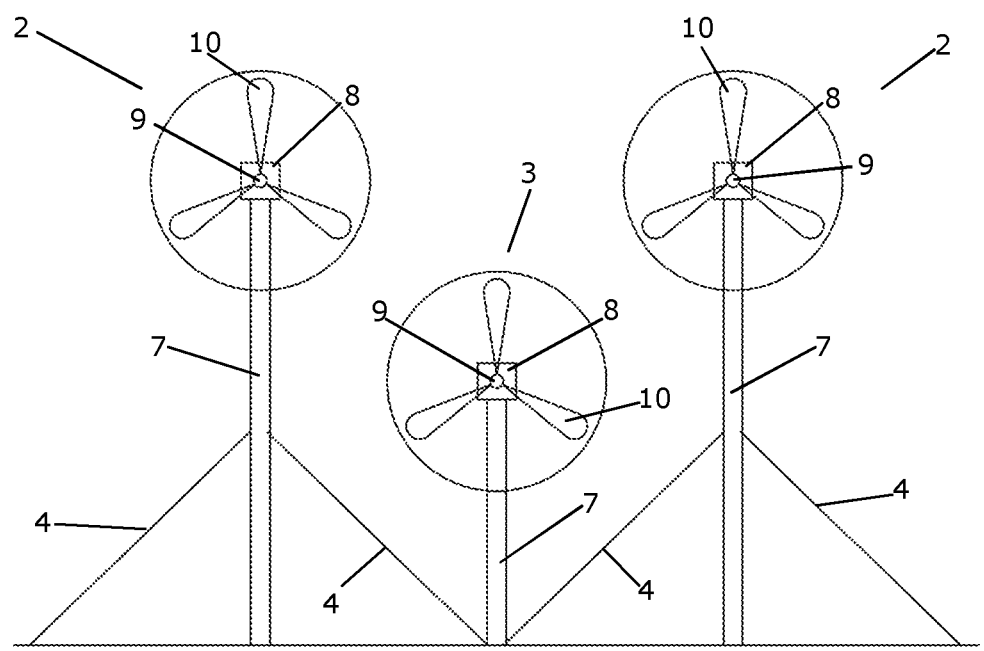
FIG. 4 is a front view of the three wind turbines of FIG. 3.

Three of the wind turbines 2, 3 are marked by a box 5. These wind turbines 2, 3 are illustrated in FIGS. 3 and 4, and will be described in further detail below.

Figure 2:
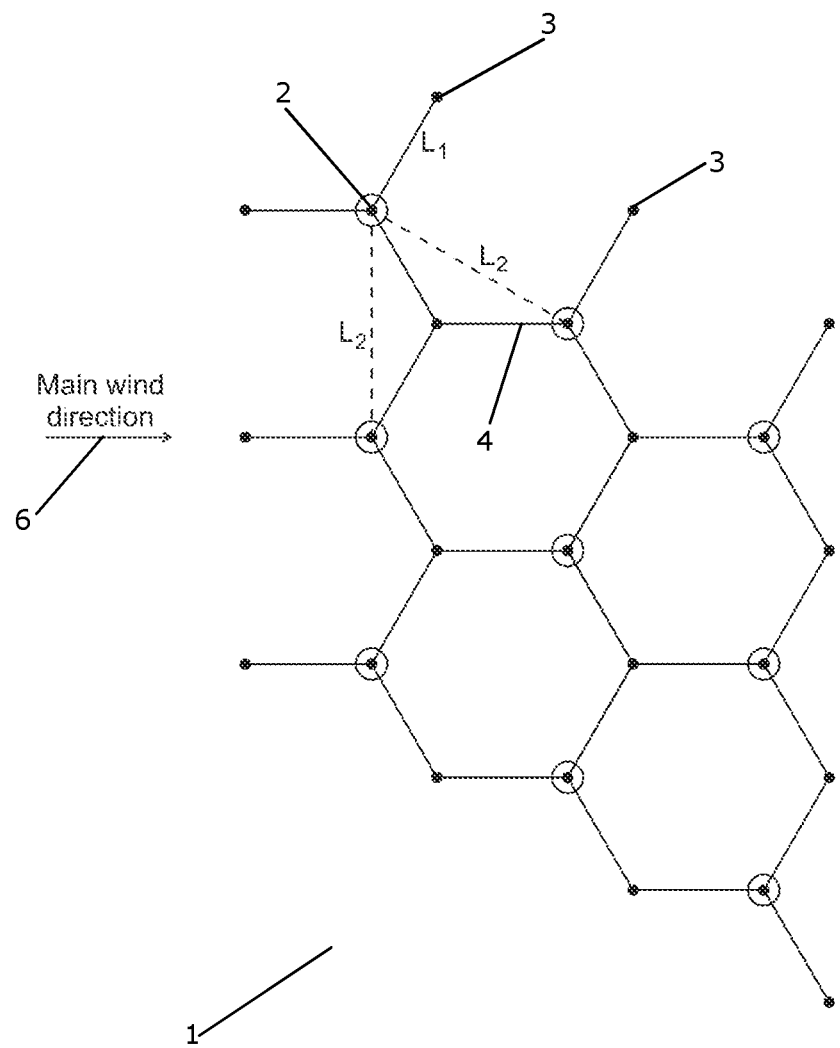
FIG. 2 illustrates a layout of a wind energy farm according to a second embodiment of the invention.

FIG. 2 illustrates a layout of a wind energy farm 1 according to a second embodiment of the invention. FIG. 2 illustrates nine first wind turbines 2 and fifteen second wind turbines 3. Each of the first wind turbines 2 is provided with three stay cables 4, each stay cable 4 being connected at one end to a tower of the first wind turbine 2 and at the other end to the foundation of one of the second wind turbines 3.

The wind turbines 2, 3 are arranged in wind turbine clusters, each wind turbine cluster comprising a first wind turbine 2 and the three second wind turbines 3 having foundations to which the stay cables 4 of the first wind turbine 2 are connected. Some of the second wind turbines 3 have stay cables 4 of two or three of the first wind turbines 2 connected to their foundation. These second wind turbines 3 form part of the wind turbine clusters defined by each of these first wind turbines 2. The main wind direction, i.e. the wind direction which occurs most often at the site of the wind energy farm 1, is illustrated by arrow 6.

The wind turbines 2, 3 of the wind energy farm 1 are arranged in such a manner that, along the main wind direction 6, a row of second wind turbines 3 is initially encountered by the incoming wind. Immediately behind these second wind turbines 3, a row of first wind turbines 2 is arranged, followed by a row of second wind turbines 3, displaced along a direction perpendicular to the main wind direction 6, as compared to the first wind turbines 2 of the upstream row of first wind turbines 2, etc.

In the case that the hub height of the first wind turbines 2 is higher than the hub height of the second wind turbines 3, this layout minimises the wake effects introduced by the upwind wind turbines 2, 3. This allows the wind turbines 2, 3 to be arranged with a small distance there between, resulting in an efficient utilization of the available area at the site of the wind energy farm 1.

The first wind turbines 2 are arranged with a mutual distance between neighbouring first wind turbines 2 of L2. The distance between a first wind turbine 2 and its neighbouring second wind turbines 3 is L1, and L1<L2.

For instance, L2 may be at least 3 times the rotor diameter of the first wind turbines 2, and L1 may be between 1.1 and 3.0 times the rotor diameter of the first wind turbines 2, such as approximately 1.5 or 1.7 times the rotor diameter of the first wind turbines 2. Thereby it is ensured that the first wind turbines 2 do not create undesirable wake effects for each other. However, since the first wind turbines 2 and the second wind turbines 3 are not of the same kind, they can be arranged closer to each other without creating undesirable wake effects for each other. This is in particular the case when the hub height of the first wind turbines 2 differs from the hub height of the second wind turbines 3. Thus, the available area at the site of the wind energy farm 1 can be utilised to a greater extent than is the case for prior art wind energy farms, and the power production per unit area of the wind energy farm 1 can thereby be increased. Furthermore, since the first wind turbines 2 and the second wind turbines 3 are arranged with a mutual distance, L1, there between which is between 1.1 and 3.0 times the rotor diameter of the first wind turbines 2, the first wind turbines 2 and the second wind turbines 3 are arranged sufficiently close to each other to make it possible to use the foundations of the second wind turbines 3 as cable stay foundations for the stay cables 4 of the first wind turbines 2.

According to a first example, the first wind turbines 2 may have a hub height of 166 m and a rotor diameter of 90 m, and the second wind turbines 3 may have a hub height of 76 m and a rotor diameter of 90 m. In this case, the distance between the first wind turbines 2, L2, may be 3 times the rotor diameter, i.e. 270 m, and the distance between a first wind turbine 2 and its neighbouring second wind turbines 3, L1, may be 1.7 times the rotor diameter, i.e. 156 m.

According to a second example, the first wind turbines 2 may have a hub height of 166 m and a rotor diameter of 100 m, and the second wind turbines 3 may have a hub height of 70 m and a rotor diameter of 90 m. In this case, the distance between the first wind turbines 2, L2, may be 3 times the rotor diameter of the first wind turbines 2, i.e. 300 m, and the distance between a first wind turbine 2 and its neighbouring second wind turbines 3, L1, may be 1.7 times the rotor diameter of the first wind turbines 2, i.e. 170 m.

According to a third example, the first wind turbines 2 may have a hub height of 166 m and a rotor diameter of 110 m, and the second wind turbines 3 may have a hub height of 66 m and a rotor diameter of 90 m. In this case, the distance between the first wind turbines 2, L2, may be 3 times the rotor diameter of the first wind turbines 2, i.e. 330 m, and the distance between a first wind turbine 2 and its neighbouring second wind turbines 3, L1, may be 1.7 times the rotor diameter of the first wind turbines 2, i.e. 187 m.

According to a fourth example, the first wind turbines 2 may have a hub height of 166 m and a rotor diameter of 100 m, and the second wind turbines 3 may have a hub height of 66 m and a rotor diameter of 100 m. In this case, the distance between the first wind turbines 2, L2, may be 2.5 times the rotor diameter of the first wind turbines 2, i.e. 250 m, and the distance between a first wind turbine 2 and its neighbouring second wind turbines 3, L1, may be 1.4 times the rotor diameter of the first wind turbines 2, i.e. 140 m.

FIG. 3 is a side view of three wind turbines 2, 3 of the wind energy farm 1 illustrated in FIG. 1. More particularly, FIG. 3 shows the three wind turbines 2, 3 marked by box 5 in FIG. 1. Thus, FIG. 3 shows two first wind turbines 2 and one second wind turbine 3. Each of the wind turbines 2, 3 comprises a tower 7 and a nacelle 8 mounted on the tower 7. Each nacelle 8 carries a rotor 9 with a set of wind turbine blades 10.

It can be seen that the first wind turbines 2 have a hub height which is higher than the hub height of the second wind turbine 3, and the towers 7 of the first wind turbines 2 are higher than the tower 7 of the second wind turbine 3. Thereby the towers 7 of the first wind turbines 2 need to be stabilised. Accordingly, each of the first wind turbines 2 is provided with at least three stay cables 4. However, for the sake of clarity, only one stay cable 4 per first wind turbine 2 is shown in FIG. 3.

Each of the stay cables 4 shown in FIG. 3 is connected at one end to the tower 7 of the relevant first wind turbine 2 and at the other end to the foundation of the second wind turbine 3. Thereby the foundation of the second wind turbine 3 forms a combination foundation in the sense that it serves as a foundation for the second wind turbine 3 as well as a stay cable foundation for the stay cables 4 of the first wind turbines 2. Accordingly, separate stay cable foundations are not required, and the costs involved with installing the wind energy farm can thereby be reduced.

FIG. 4 is a front view of the wind turbines 2, 3 of FIG. 3. It can be seen that one of the stay cables 4 of each of the first wind turbines 2 is connected to the foundation of the second wind turbine 3, as described above with reference to FIG. 3. FIG. 4 further illustrates an additional stay cable 4 connected to each of the first wind turbines 2. These stay cables 4 may be connected to the foundations of other second wind turbines (not shown) or to separate stay cable foundations.

Figure 5:
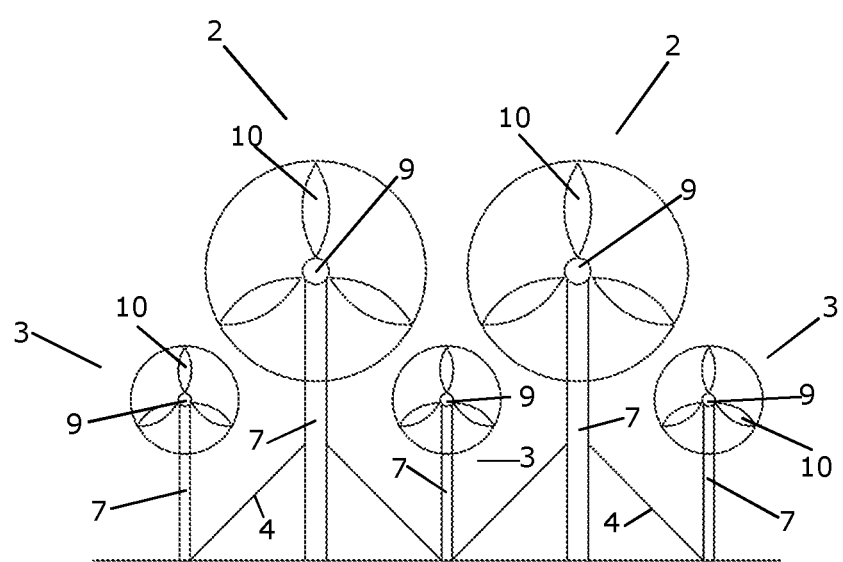
FIG. 5 is a front view of five wind turbines of a wind energy farm according to an alternative embodiment of the invention.

FIG. 5 is a front view of five wind turbines 2, 3 of a wind energy farm according to an alternative embodiment of the invention. FIG. 5 shows two first wind turbines 2 and three second wind turbines 3. The second wind turbines 3 have a hub height which is lower than the hub height of the first wind turbines 2. Furthermore, the rotor diameter of the second wind turbines 3 is smaller than the rotor diameter of the first wind turbines 2. This allows the wind turbines 2, 3 to be arranged very close to each other without creating wake effects for each other, because the rotors 9 of neighbouring wind turbines 2, 3 will not be overlapping.

The invention claimed is:

1. A wind energy farm comprising at least one first wind turbine and at least one second wind turbine, each wind turbine being a horizontal axis wind turbine comprising a tower mounted on a foundation, and at least one rotor with a hub carrying a set of wind turbine blades, wherein said at least one first wind turbine is provided with at least three stay cables, each stay cable being connected at one end to the tower of said at least one first wind turbine and at the other end to a stay cable foundation, wherein at least one of the stay cable foundations and the foundation of one of said at least one second wind turbines of the wind energy farm are combined into a single combination foundation, wherein the at least one first wind turbine has a higher hub height than the at least one second wind turbine.

2. The wind energy farm according to claim 1, wherein the at least one first wind turbine has a rotor diameter which differs from a rotor diameter of the at least one second wind turbine.

3. The wind energy farm according to claim 1, wherein the wind energy farm comprises at least one wind turbine cluster, each wind turbine cluster comprising one first wind turbine and at least one second wind turbine.

4. The wind energy farm according to claim 3, wherein the wind energy farm comprises at least two wind turbine clusters and wherein at least one of the stay cables of at least two neighbouring wind turbine clusters share a combination foundation.

5. The wind energy farm according to claim 3, wherein the wind energy farm comprises at least two wind turbine clusters, and wherein a first wind turbine of one wind turbine cluster and a first wind turbine of a neighbouring wind turbine cluster are arranged with a distance, A, between them, wherein the distance, A, between first wind turbines of neighbouring wind turbine clusters is at least three times a rotor diameter of the wind turbines.

6. The wind energy farm according to claim 3, wherein the first wind turbine and each of the at least one second wind turbines of a wind turbine cluster are arranged with a distance between them, wherein the distance between the first wind turbine and each of the at least one second wind turbines of a wind turbine cluster is between 1.1 and 3.0 times a rotor diameter of the wind turbines.

7. The wind energy farm according to claim 3, wherein the distance between an upstream first wind turbine or second wind turbine and a downstream second wind turbine or first wind turbine, respectively, with overlapping rotors, is at least three times the rotor diameter of the upstream wind turbine.

8. The wind energy farm according to claim 1, wherein at least one of the second wind turbines is provided with at least three stay cables.

9. The wind energy farm according to claim 8, wherein at least one of the stay cables of the at least one second wind turbine is connected to a combination foundation formed at the foundation of the at least one first wind turbine.

10. The wind energy farm according to claim 1, wherein at least one stay cable of at least one first wind turbine is connected to a stay cable foundation to which a stay cable of another first wind turbine is also connected.

11. The wind energy farm according to claim 1, wherein at least one stay cable of at least one of the first wind turbines defines an angle with respect to horizontal which is between 35° and 50°.

12. The wind energy farm according to claim 1, wherein at least one of the wind turbines is a multirotor wind turbine.

13. A wind turbine for use in a wind energy farm according to claim 1, the wind turbine comprising a tower mounted on a foundation, at least one rotor with a hub carrying a set of wind turbine blades, and at least three stay cables connected at one end to the tower of the wind turbine and at the other end to a stay cable foundation, wherein at least one of the stay cable foundations and the foundation of another wind turbine arranged in the wind energy farm are combined into a single combination foundation.

14. The wind energy farm according to claim 8, wherein the at least three stay cables of the at least one of the second wind turbines are arranged substantially equidistantly along a circumference of the tower.

* * * * *